(12) United States Patent
Xu

(10) Patent No.: US 10,511,687 B2
(45) Date of Patent: Dec. 17, 2019

(54) SYSTEMS AND METHODS FOR MOBILE DEVICE PREDICTIVE RESPONSE CAPABILITIES

(71) Applicant: SAP SE, Walldorf (DE)

(72) Inventor: Finley Xu, Shanghai (CN)

(73) Assignee: SAP SE, Walldorf (DE)

( * ) Notice: Subject to any disclaimer, the term of this patent is extended or adjusted under 35 U.S.C. 154(b) by 1129 days.

(21) Appl. No.: 14/853,348

(22) Filed: Sep. 14, 2015

(65) Prior Publication Data

US 2017/0076210 A1  Mar. 16, 2017

(51) Int. Cl.

| G06F 17/00 | (2019.01) |
| G06F 17/20 | (2006.01) |
| H04L 29/08 | (2006.01) |
| H04L 29/06 | (2006.01) |
| G06F 16/957 | (2019.01) |
| G06N 20/00 | (2019.01) |

(52) U.S. Cl.
CPC ............ *H04L 67/32* (2013.01); *G06F 16/957* (2019.01); *G06N 20/00* (2019.01); *H04L 67/42* (2013.01)

(58) Field of Classification Search
CPC ................................. G06F 16/957; G06N 5/04
See application file for complete search history.

(56) References Cited

U.S. PATENT DOCUMENTS

| 7,324,924 B2 | 1/2008 | Barajas et al. |
| 8,429,103 B1 | 4/2013 | Aradhye et al. |
| 8,856,279 B2 | 10/2014 | Stavrakos et al. |
| 8,938,488 B1 | 1/2015 | Sayed |
| 2006/0271641 A1* | 11/2006 | Stavrakos ............... H03M 7/30 709/217 |
| 2007/0219846 A1* | 9/2007 | Mogensen ............. G06Q 10/10 705/35 |
| 2008/0201338 A1 | 8/2008 | Castro et al. |
| 2009/0036102 A1 | 2/2009 | Ho |
| 2009/0187573 A1 | 7/2009 | Johnston et al. |
| 2010/0004941 A1* | 1/2010 | Chang .................... G06Q 10/06 705/1.1 |
| 2011/0055318 A1 | 3/2011 | Srinivasan et al. |
| 2014/0359074 A1 | 12/2014 | Igelka |

* cited by examiner

*Primary Examiner* — Luis A Sitiriche

(74) *Attorney, Agent, or Firm* — Buckley, Maschoff & Talwalkar LLC

(57) ABSTRACT

A mobile device includes a frontend application, a prediction layer including a dispatch unit, prediction generation unit, metadata store, and curve fitting unit. A method includes receiving at the prediction layer a frontend application service request, forwarding the service request about contemporaneously to the curve fitting unit, prediction generation unit, and a backend server, the prediction generation unit searching the metadata store for a predictive formula associated with the service request, calculating a response using the predictive formula, and providing the calculated response for display in a user interface as an interim result to the service request. A response from the backend server is displayed by the frontend application. The curve fitting unit generates and/or refines a predictive formula for the service request based on the service request parameters and the backend server response. A non-transitory computer-readable medium is also disclosed.

20 Claims, 4 Drawing Sheets

| REQUEST IDENTIFIER | KNOWN PARAMETERS | PREDICTIVE FORMULA |
|---|---|---|
| Calc_OrderLine | (x=1, y=2, z=0) => u=2, v=2<br>(x=1, y=2, z=0) => u=8, v=8<br>(x=1, y=2, z=0) => u=10, v=10<br>(x=1, y=2, z=0) => u=2, v=2 | $u=x*y$<br>$v=x*y*(1-z/100)$ |
| Calc_Tax | (x=0, y=1) => u=2, v=1<br><br>(x=2, y=0) => u=5, v=1 | $u=F(x,y)$<br><br>$v=G(x,y)$ |

FIG. 4

SYSTEMS AND METHODS FOR MOBILE DEVICE PREDICTIVE RESPONSE CAPABILITIES

BACKGROUND

Representational State Transfer ("REST") is an architectural style that when applied to a web service can improve the web service's performance Standardized interfaces and protocols are used by clients and servers to exchange representations of resources. A service based on REST is called a RESTful service. REST is not dependent on any protocol, but many RESTful services use hypertext transfer protocol ("HTTP") as an underlying protocol.

REST has become the default for most Web and mobile applications ("apps"). Indeed, a large portion of modern mobile apps rely on RESTful services in the backend. These mobile applications can be running on mobile devices (e.g., smartphones, tablets, handheld computers, smart watches, personal digital assistants, handheld game consoles, etc.). The importance of REST is likely to continue growing quickly as technology moves towards an API orientation. Every major development language now includes frameworks for building RESTful Web services.

Business logic-related requests from mobile apps are sent to the backend in a manner that all elements needed to serve the request are provided in a single transaction. This so-called 'stateless' protocol style makes sure that a backend request-handler (i.e., server) can serve its frontend client without knowing the context ('state') within which the client has initiated the request. Every interaction with a resource could be stateless; that is, request messages are self-contained.

The stateless style of RESTful services constrains client-server communication because there is no client context stored on the server between requests. Each request from a client contains all the information necessary to service the request, and the session state is held in the client. The client begins sending requests when it is ready to make the transition to a new state. While one or more requests are outstanding, the client is considered to be in transition. When in transition, the client mobile application can be in a suspended environment (i.e., a non-responsive state pending a reply from the backend server). This non-responsive state can be of indeterminate length due to system latency while waiting on a response to its request from the server. This suspended environment can cause the mobile device to hang-up until the response is received.

The separation of the frontend mobile app from its backend server introduces this potential latency problem. Mobile apps are considered more vulnerable to the problem because of the potential for an unstable data link between the server and the mobile device.

BRIEF DESCRIPTION OF THE DRAWINGS

FIG. 4 depicts a data record format in accordance with embodiments; and

DETAILED DESCRIPTION

Systems and methods in accordance with embodiments, provide predication data in response to a request message from a local mobile app sent to a remote backend server. These predictions can ease latency issues of mobile apps, and the devices they run on, due to the suspended environment while conventionally waiting on a response from the backend server. Additionally, the predictions can have usage in mobile app software testing.

Figures 1, 2:
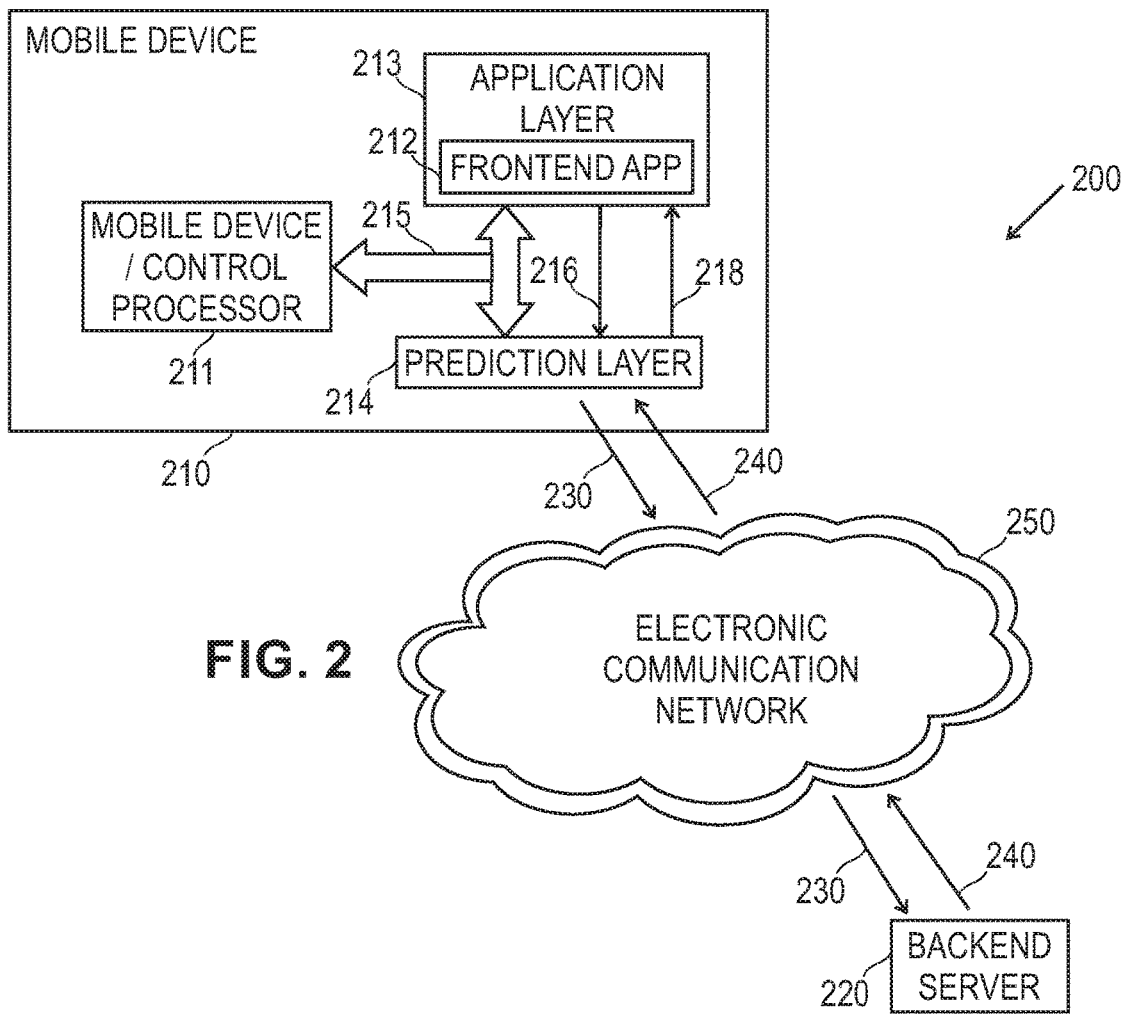
FIG. 1 depicts a conventional user interface for a mobile application.
FIG. 2 depicts a block diagram of a mobile device system in accordance with embodiments.

FIG. 1 depicts conventional mobile application user interface 100. The user interface, for example, can be used for data entry by the user of a mobile device. The format, display, and look of the user interface is dependent on the frontend app running on the mobile device. In the depicted example, user interface 100 includes three line items 101, 102, 103. Each of the line items includes an entry filed for product name/unit price and an entry field for quantity. Associated with each line item is a corresponding line total display box 110, 120, 130.

After a user enters the product, quantity, and unit price on sales order line item 101, the mobile client can send the backend server a message requesting the line total amount 110. Though the calculation of this exemplary order is as simple as 10 multiplied by 1, modern client-server implementations almost always hand business logic-heavy tasks to a backend server for good reasons. If the mobile app is implementing RESTful services, then both 10 and 1 are sent together in the same message to the backend server. Both values are sent because the backend server is not aware of the state of the Sales Order in general, and the specific two values needed beforehand. By developing and implementing business logic at the backend, frontend apps can be replaced, updated, and/or adapted more readily with less expense. Additionally, the two components can be developed separately as long as the interface remains unchanged.

Under conventional implementations after a response is received back from the server, the calculation for line total 120 follows the same procedure. A request with the exact the same payload (unit price=$10; quantity=1) may be cached at the frontend (if the frontend is configured with that capability), but caching a prior result is not applicable as the payload is different. The previous calculation process cannot be reused because the mobile frontend has no knowledge of what the backend server knows about the business logic. Similarly, a conventional implementation repeats the same process to calculate line total 130.

If the mobile connection between frontend and backend hardware is unstable, creating a sales order of multiple lines, one line item at a time could be cumbersome and unproductive. The conventional user experience (UX) can only be changed by altering the business logic code so that multiple line totals are calculated at the backend in one request that provides all sufficient data. However, a change of the business logic at the frontend is not desirable as the design change will alter the UX. Users could object to waiting to send the service request until multiple lines are entered, since this change would not provide responses for each individual entry line as data entry is completed. Further, this reduction of interactivity can make the UX for touch sensitive devices sluggish and seemingly non-responsive. Further, mobile frontend apps, especially written in popular JavaScript, are vulnerable to data modifications and exposure of sensitive business logic handling codes making changing the business logic code of the frontend app even less a desirable approach.

FIG. 2 depicts mobile device system 200 in accordance with some embodiments. An embodying mobile device system includes mobile device 210 and backend server 220. The mobile device and backend server communicate across electronic communication network 250.

Electronic communication network 250 can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that techniques and systems disclosed herein are not limited by the nature of network 250.

Mobile device 210 includes control processor 211 running computer executable instructions to implement application layer 213 that includes frontend app 212. Frontend app 212 can include an order entry user interface, such as user interface 100. In accordance with embodiments, mobile device 210 also includes prediction layer 214 in communication with the frontend app. The control processor instructs and/or controls the components of the prediction layer. Internal data bus 215 interconnects the control processor, frontend app, and prediction layer.

The control processor may be a processing unit, a field programmable gate array, discrete analog circuitry, digital circuitry, an application specific integrated circuit, a digital signal processor, a reduced instruction set computer processor, etc. Server 110 may include internal memory (e.g., volatile and/or non-volatile memory devices) coupled to the control processor.

In accordance with embodiments, prediction layer 214 receives request communication 216 from frontend app 212. The prediction layer sends service request 230 to backend server 220. The prediction layer implements fuzzy logic to provide fuzzy response 218 to the frontend app.

For example with regard to the price and quantity discussed above for FIG. 1, an embodying prediction layer can implement a first degree curve fitting process using linear data points (1, $10), (2, $20) previously received from the server in response to requests for line totals 110, 120, to provide a fuzzy response of '40' for line total 130.

Fuzzy response 218 can be provided prior to the return of real response 240 from the backend server. The fuzzy response can be displayed as an interim result until response 240 is received. In accordance with implementations, the fuzzy response of $40 can be rendered with a different UX to indicate that it is an interim result. For example, the response could be rendered in the user interface with a specific style—e.g., the display can be flashing, highlighted, italicized, etc. The prediction layer is provided with response 240 to heuristically improve its data fitting algorithm(s). Prediction layer forwards the backend server response to the frontend app.

Once real response 240 is received at the frontend app, the calculated data can be displayed. In accordance with some implementations, the response sent to the frontend app from the prediction layer can contain additional information identifying to the frontend app whether this response is a fuzzy result 218 or a real result 240. The frontend app can then apply different UX designs to reflect the nature of the response.

Prediction layer 214 is not a complete replacement of the manually-written business logic code operating at the backend server. The curve fitting process(es) implemented by the prediction layer are fuzzy in nature. Although the prediction accuracy/capability can improve as more real response values are provided to the prediction layer, the solution from prediction layer 214 is from a fuzzy logic algorithm. The backend server can provide better results, if for example, when quantity is greater than 200 a discount is then applied to the unit price.

The above example discloses one implementation using a linear curve fit as the data fitting algorithm for a simple sales order entry form. Embodying systems and methods are not so limited. Embodying prediction layers can be implemented with multivariate data fitting techniques—such as, but not limited to, higher order curve fitting, non-linear regression, smoothing algorithms, total least squares, function approximation, etc.

Figure 3:
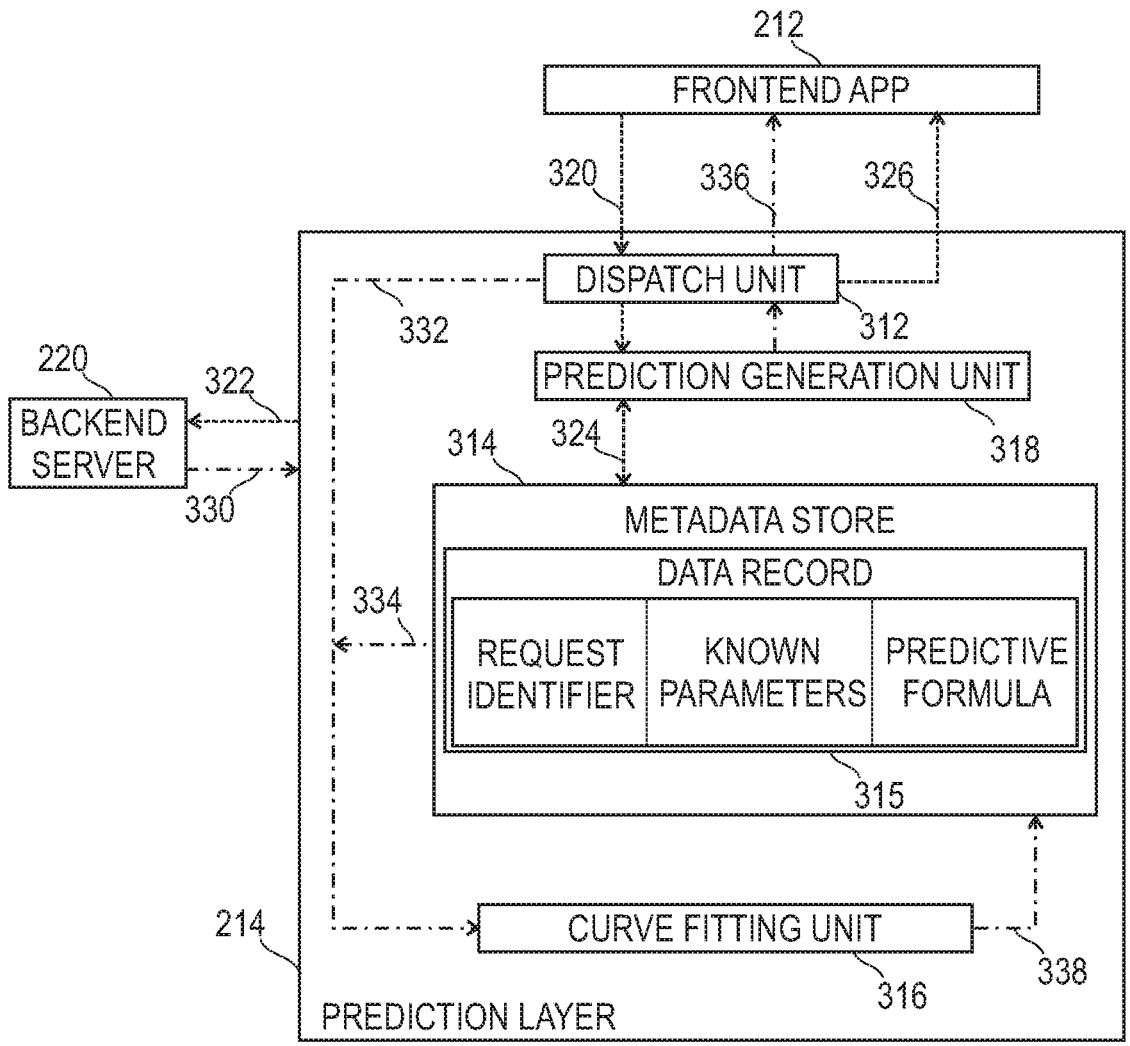
FIG. 3 depicts a prediction layer in accordance with embodiments.

FIG. 3 depicts predication layer 214 in accordance with embodiments. The frontend app sends service request 320 to the prediction layer. Dispatch unit 312 receives the service request and forwards the service request 322 to the backend server across electronic communication network 250. As long as both ends of a communication are implementing a RESTful protocol, the frontend app does not need the identity of the request message destination. The frontend app cannot ordinarily tell whether it is connected directly to the end server, or to an intermediary along the way. Intermediary servers may improve system scalability by enabling load balancing and by providing shared caches; the intermediary may also enforce security policies.

Dispatch unit 312 also forwards the service request to prediction generator unit 318. The prediction generator unit performs data operations of the prediction layer, as disclosed below. Metadata store 314 within prediction layer 214 includes data record 315 containing request identifiers, known parameters and predictive formula fitting equations developed by the prediction layer from previous requests. The prediction generator unit is in communication with the metadata store across line 324. Prediction generator unit 318 performs a search of data record 315 within metadata store 314 to match parameters of the present request with dimensions of the metadata store. In some implementations, this search for matches can be enhanced using data filtering.

A RESTful request can retain a full snapshot of the resource being represented in its payload. This retained snapshot can have the request contain properties (e.g., prior input parameters) irrelevant to the current requested action. Indiscriminate inclusion of input parameters can impact the accuracy and performance of the curve fitting. Data filtering strategies can be used to provide the more relevant parameters before they are passed to the fitting unit.

For example, a white list of parameters can be defined in each of the requested actions. This white list itself can be transmitted to the prediction layer along with the request. In accordance with implementations, an application level protocol can be defined and/or expanded between the frontend app and the prediction layer. This application level protocol could be on top of the RESTful protocol. In other implementations, for example, an automatic analysis process can be applied inside the prediction layer. This analysis process can use a series of historical parameters along with predictive techniques (e.g., regression analysis and the like) to assert the most relevant input parameters. The automatic analysis process can increase processor overhead when compared to the white list approach, but does not involve changing the frontend app.

If there is a match between the current intercepted response and parameters/formula in the metadata store, prediction generator unit generates fuzzy response 326, which is provided to the frontend app by dispatch unit 312.

In accordance with embodiments, curve fitting unit 316 operates in the curve generation/refinement workflow. The curve fitting unit generates predictive formulas, and then later refines the predictive formulas using actual results from the backend server. Existing parameters and functions, are provided to curve fitting unit 316 along communication line 334 for refinement. These predictive formulas, stored in metadata store 314, are applied to input parameters contained in the service request from the frontend app.

Server response 330 is obtained by the prediction layer 214. The server response data is provided by dispatch unit 312 to the curve fitting unit along communication line 332. Curve fitting unit 316 refines the accuracy of the metadata store by expanding the dimensions of the data and providing new formulas within data record 315 based on an error evaluation algorithm that uses a comparison of the fuzzy result with the server response. This expanded, refined data is provided to the metadata store along communication line 338. About contemporaneously with the refinement activities, response 330 from the backend server is relayed to the mobile device (signal 336) without any interference by the curve fitting unit.

In accordance with some embodiments, the fitting equations the prediction layer generates, and stores in metadata store 314, can be uploaded to a dedicated server. These fitting equations can be provided by download to other mobile devices or user instances when network conditions are not experiencing a high latency. The downloaded fitting equations can then be leveraged by the other mobile devices and user instances when network conditions have a high latency. Providing the fitting equations to the other devices/ users, gives a head start to the heuristic algorithms operating in those other devices. Thus, possibly giving a head start of using fuzzy calculation later without any requests sent to and got back from a real server. The real values (i.e., response 330) supplied to the prediction layer, increases the accuracy of subsequent predictions.

In accordance with embodiments, the prediction layer capabilities can also be used in the software testing area. In accordance with implementations, by accessing collected user data an entire backend server can be theoretically constructed (e.g., mocked-up). When fed with manually generated requests (such as collected user requests) or automatically generated requests produced by automated testing techniques, along with related responses, the prediction layer learns from the requests/responses as if they are sent from/to a real client.

The prediction layer then can act as a mock-up server responding to specific or general requests. This can be applied to frontend app testing as it makes the testing independent to changes of a real server, or mocks features involving numerically predictable values that has not implemented yet. Backend testing can also use the prediction flayer as a black box style 'control group' compared to a real server that is being tested.

FIG. 4 depicts the format of data record 315 in accordance with embodiments. Embodying systems are not so limited. It is understood that other formats for the data record are equally acceptable. Request Identifier (Calc_Orderline, Calc_Tax) can be contextual—i.e., related to the nature of the calculation. For example, with reference to FIG. 1, user interface 100 is a dynamic order entry screen. Input parameters within the RESTful service request from the frontend app can include unit price x, quantity y, and discount percentage z. Predictive formulas developed by the prediction layer, as disclosed above, provide output parameters total cost u, and discounted total cost v. The predictive formulas themselves are u=x*y; and v=x*y*(1−z/100).

By way of another example, to emphasize that the predictive abilities are not limited to linear fits, Calc_Tax demonstrates a situation involving input and output parameters both of multi-dimension type. Here the RESTful request includes two input parameters x, y; and a response includes two output parameters u, v. The predictive formulas developed by the prediction layer are non-linear functions u=F(x,y) and v=G(x,y).

Figure 5:
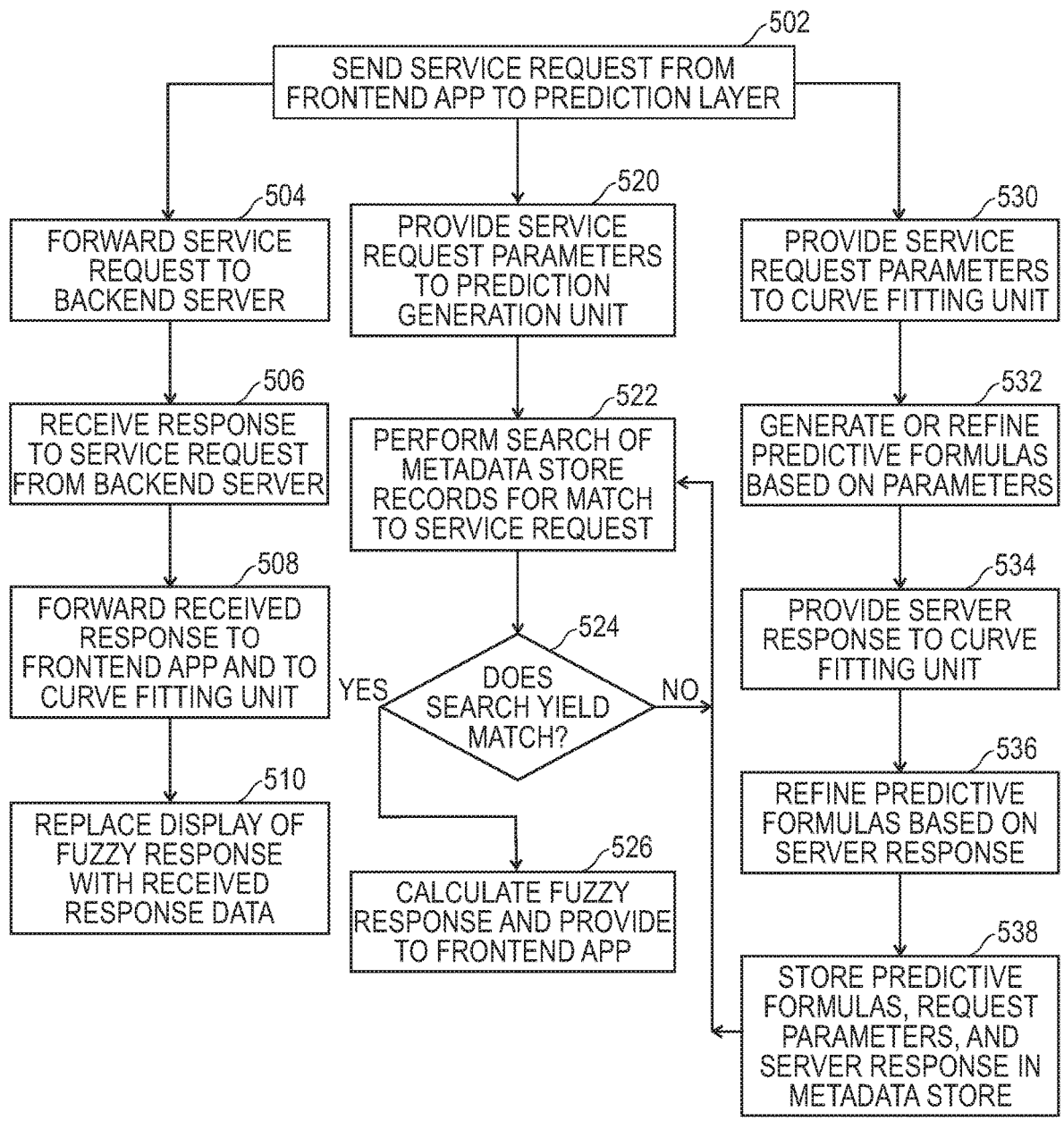
FIG. 5 depicts a process for responding to a mobile app service request in accordance with embodiments.

FIG. 5 depicts process 500 for responding to a mobile app service request in accordance with embodiments. As depicted in FIG. 5, process 500 can have three basic flow paths, which interrelate with each other—the first path (steps 504-510) sends the service request to a backend server, which returns a response; in the second path (steps 520-526), the prediction generation unit searches for matches to the service request parameters and calculates the fuzzy response; and in the third path (steps 530-532), the curve fitting unit receives the service request parameters and the response data from the backend server, which are used to generate (first pass) or refine (subsequent passes) the predictive formulas stored in the metadata store. In accordance with implementations, these three flow paths can occur about contemporaneously with each other.

At step 502, a service request from frontend app 212 is received at prediction layer 214. Dispatch unit 312 within the prediction layer forwards, step 504, the service request across electronic communication network 250 to backend server 220. The backend server applies business logic code to provide a response to the service request, and returns the response.

Prediction layer 214 receives, step 506, the service request response from the backend server. The dispatch unit forwards, step 508, the received response to the frontend app. Also, the dispatch unit forwards the received response to curve fitting unit 316. To indicate that a response to the service request was received, the dispatch unit sets a response received indication—e.g., a flag, a register, etc. The received response is displayed, step 510, in a user interface associated with the frontend app.

About contemporaneously with forwarding the service request to the backend server (step 504), the dispatch unit forwards the service request and its parameters to prediction generation unit 318, step 520. The prediction generation unit performs a search, step 522, of data records 315 of metadata store 314. The search is to identify a predictive formula, and similar format parameters from which the prediction generation unit can develop an interim fuzzy response. At step 524, a determination is made as to whether the search has yielded a match. If the search has yielded a match, the prediction generation unit calculates, step 526, a fuzzy response. This fuzzy response is provided by the dispatch unit to the frontend app for display in its user interface.

In accordance with implementations, the fuzzy response is only provided to the frontend app if the response received indication is not set. In other implementations if the response received indication is set, steps 520-526 are not performed.

If at step 524 the determination yields that a match has not been found, process 500 loops back to step 522 to continue the search. This loop can terminate when the response received indication is set.

About contemporaneously with forwarding the service request both to the backend server (step 504) and to the prediction generation unit (step 520), the dispatch unit forwards the service request and its parameters to the curve fitting unit. After the curve fitting unit receives the backend server response data (step 508), the curve fitting unit can refine the predictive formula(s), step 530, for this service request based on the service request parameters and the server response data. If this is the first time that this particular service request has been called by the frontend app, the curve fitting unit can generate the predictive formula. In accordance with implementations, curve fitting techniques use value pairs of input parameter(s)(e.g., a one dimensional 'x' value) and output parameter(s) (e.g., a one dimensional 'y' value) to construct a curve on the X-Y plane.

The predictive formula is stored in the metadata store along with the service request parameters and the server response data. Process 500 can continue to loop between steps 522-524 to search the metadata store records for the predictive formula.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as a method for providing fuzzy responses to frontend app service requests to reduce latency issues in mobile devices, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A mobile device comprising:
an application layer including a frontend application, the frontend application having a user interface for data entry by a user;
a prediction layer including a dispatch unit, a prediction generation unit, a metadata store, and a curve fitting unit;
the prediction layer configured to receive a service request from the frontend application, the prediction layer configured to send the service request to a backend server, the backend server remote from the mobile device;
prior to receiving a response from the backend server, the mobile device curve fitting unit configured to generate predictive formulas using existing parameters and functions;
the prediction generation unit configured to identify a predictive formula with similar format parameters as the service request, and to calculate an interim response from the identified predictive formula;
after receiving the backend server response, the curve fitting unit configured to refine at least the identified predictive formula using the received response; and
a control processor configured to execute instructions to control operations of the application layer, the frontend application, the prediction layer, the dispatch unit, the prediction generation unit, the metadata store, and the curve fitting unit.

2. The mobile device of claim 1, the service request including parameters for calculation of a response related to the data entered by the user.

3. The mobile device of claim 1, including the dispatch unit configured to forward the service request to a backend server in communication with the mobile device across an electronic communication network.

4. The mobile device of claim 1, including the prediction generation unit configured to search records of the metadata store.

5. The mobile device of claim 4, the records including a request identifier associated with a respective service request, a set of known parameters associated with the respective service request, and a predictive formula associated with the respective service request.

6. The mobile device of claim 5, including the prediction generation unit configured to calculate a response to the service request based on service request parameters and the predictive formula associated with the respective service request.

7. The mobile device of claim 1, including the dispatch unit configured to provide a response to the frontend application service request, the response generated by the prediction generation unit based on parameters of the service request and a predictive formula stored in the metadata store.

8. The mobile device of claim 1, including the curve fitting unit configured to refine the predictive formula based on parameters of the service request and a response to the service request received from a backend server in communication with the mobile device across an electronic communication network.

9. A method of providing a response to a service request from a frontend application of a mobile device, the mobile device including a prediction layer having a dispatch unit, a prediction generation unit, a metadata store, and a curve fitting unit, the method comprising:
receiving at the prediction layer a service request from the frontend application, the service request including parameters for calculation of a response to data entered by a user;
the dispatch unit forwarding the service request about contemporaneously to the curve fitting unit, the prediction generation unit, and a backend server, the backend server in communication with the mobile device across an electronic communication network;
prior to receiving a response from the backend server, the mobile device curve fitting unit generating predictive formulas using existing parameters and functions;
the prediction generation unit searching the metadata store to identify records containing a predictive formula with similar format parameters as the service request;

the prediction generation unit calculating an interim response to the service request using the identified predictive formula;

providing the calculated interim response to the frontend application for display in a user interface as an interim result to the service request; and after receiving the backend server response, the curve fitting unit refining at least the identified predictive formula using the received response.

10. The method of claim 9, including displaying the interim result with a specific style indicating to a user that it is the interim result.

11. The method of claim 9, including:

receiving a response from the backend server;

the dispatch unit forwarding the received response to the frontend application for display in the user interface; and the dispatch unit forwarding the received response to the curve fitting unit.

12. The method of claim 11, including setting an indication at the dispatch unit that a response was received from the backend server.

13. The method of claim 9, including:

the curve fitting unit generating a predictive formula based on the parameters of the service request and a response to the service request received from the backend server; and storing the predictive formula in a record of the metadata store.

14. The method of claim 13, including the curve fitting unit refining the predictive formula based on the parameters and the response to the service request received from the backend server.

15. A non-transitory computer-readable medium having stored thereon instructions which when executed by a control processor of a mobile device cause the mobile device to perform a method providing a response to a service request from a frontend application of the mobile device, the method comprising:

receiving at a prediction layer of the mobile device the service request from the frontend application, the service request including parameters for calculation of a response to data entered by a user;

a dispatch unit of the prediction layer forwarding the service request about contemporaneously to a curve fitting unit of the prediction layer, a prediction generation unit of the prediction layer, and a backend server, the backend server in communication with the mobile device across an electronic communication network;

prior to receiving a response from the backend server, the mobile device curve fitting unit generating predictive formulas using existing parameters and functions;

the prediction generation unit searching a metadata store of the prediction layer to identify records containing a predictive formula with similar format parameters as the service request;

the prediction generation unit calculating an interim response to the service request using the identified predictive formula;

providing the calculated interim response to the frontend application for display in a user interface as an interim result to the service request; and after receiving the backend server response, the curve fitting unit refining at least the identified predictive formula using the received response.

16. The non-transitory computer-readable medium of claim 15, the instructions further configured to cause the control processor to perform the step of displaying the interim result with a specific style indicating to a user that it is the interim result.

17. The non-transitory computer-readable medium of claim 15, the instructions further configured to cause the control processor to perform the steps of:

receiving a response from the backend server;

the dispatch unit forwarding the received response to the frontend application for display in the user interface; and the dispatch unit forwarding the received response to the curve fitting unit.

18. The non-transitory computer-readable medium of claim 17, the instructions further configured to cause the control processor to perform the step of setting an indication at the dispatch unit that a response was received from the backend server.

19. The non-transitory computer-readable medium of claim 15, the instructions further configured to cause the control processor to perform the steps of:

the curve fitting unit generating a predictive formula based on the parameters of the service request and a response to the service request received from the backend server; and storing the predictive formula in a record of the metadata store.

20. The non-transitory computer-readable medium of claim 19, the curve fitting unit refining the predictive formula based on the parameters of the service request and a response to the service request received from the backend server.

* * * * *